US009569656B2

(12) United States Patent
Khandpur et al.

(10) Patent No.: US 9,569,656 B2
(45) Date of Patent: Feb. 14, 2017

(54) LOCAL REAL-TIME FACIAL RECOGNITION

(71) Applicant: Google Inc., Mountain View, CA (US)

(72) Inventors: Sundeep Singh Khandpur, Sunnyvale, CA (US); John Mathias Barr, Toronto (CA)

(73) Assignee: GOOGLE INC., Mountain View, CA (US)

( * ) Notice: Subject to any disclaimer, the term of this patent is extended or adjusted under 35 U.S.C. 154(b) by 367 days.

(21) Appl. No.: 14/099,781

(22) Filed: Dec. 6, 2013

(65) Prior Publication Data

US 2015/0163448 A1 Jun. 11, 2015

(51) Int. Cl.
   H04N 9/47 (2006.01)
   H04N 7/18 (2006.01)
   G06K 9/00 (2006.01)
   H04N 5/77 (2006.01)

(52) U.S. Cl.
   CPC .......... *G06K 9/00221* (2013.01); *H04N 5/772* (2013.01); *G06K 9/00979* (2013.01); *G06K 2009/00328* (2013.01)

(58) Field of Classification Search
   CPC ................................................. G06K 9/00295
   USPC .......................................................... 348/77
   See application file for complete search history.

(56) References Cited

U.S. PATENT DOCUMENTS

| 7,130,454 B1 | 10/2006 | Berube et al. |
| 8,261,090 B1 | 9/2012 | Matsuoka |
| 2003/0161507 A1 | 8/2003 | Lawandy |
| 2009/0252383 A1 | 10/2009 | Adam et al. |
| 2009/0262987 A1 | 10/2009 | Ioffe et al. |
| 2010/0260373 A1 | 10/2010 | Neven et al. |
| 2010/0316302 A1 | 12/2010 | Lueck |
| 2011/0116690 A1 | 5/2011 | Ross et al. |
| 2012/0070042 A1 | 3/2012 | Ioffe et al. |
| 2013/0121540 A1 | 5/2013 | Garcia et al. |
| 2014/0063249 A1* | 3/2014 | Miller ............ G06F 17/30247 348/148 |

FOREIGN PATENT DOCUMENTS

WO   WO-2012/134756 A2   10/2012

* cited by examiner

*Primary Examiner* — Hung Dang
*Assistant Examiner* — Girumsew Wendmagegn
(74) *Attorney, Agent, or Firm* — McDermott Will & Emery LLP

(57) ABSTRACT

A system and machine-implemented method for real-time facial recognition at an image capture device is provided. The method includes capturing an image at an image capture device, the image containing at least a first person, analyzing the image to identify one or more data points corresponding to the first person, determining if mapping information corresponding to the one or more data points is locally available at the image capture device, sending a request to a remote device for mapping information when it is determined that mapping information corresponding to the one or more data points is not locally available at the image capture device, receiving mapping information corresponding to the one or more data points in response to the request and locally storing the mapping information at the image capture device.

20 Claims, 3 Drawing Sheets

LOCAL REAL-TIME FACIAL RECOGNITION

BACKGROUND

Image capture devices, such as glasses or other devices with image capture capability, are becoming more prevalent. These image capture devices are able to capture images of their surrounding and allow the user to interact with the surrounding more intelligently based on the captured images. In some instances, the image capture devices are able to capture images of nearby users (e.g., in the field of view of the image capture device). A user operating the image capture device is typically associated with various services (e.g., social networking services) that maintain information regarding contacts of the user. The information can be used to assist the user operating the image capture device in interacting with nearby users.

SUMMARY

The disclosed subject matter relates to a machine-implemented method for real-time facial recognition at an image capture device, the method comprising capturing an image at an image capture device, the image containing at least a first person. The method may further include analyzing the image to identify one or more data points corresponding to the first person. The method may further include determining if mapping information corresponding to the one or more data points is locally available at the image capture device. The method may further include sending a request to a remote device for mapping information when it is determined that mapping information corresponding to the one or more data points is not locally available at the image capture device. The method may further include receiving mapping information corresponding to the one or more data points in response to the request. The method may further include locally storing the mapping information at the image capture device.

The disclosed subject matter also relates to an image capture device configured to capture images, the image capture device comprising a local data store and a recognition module. The recognition module may be configured to analyze an image captured by the image capture device to identify one or more data points corresponding to a first person within the image. The recognition module may be configured to determine if mapping information corresponding to the one or more data points is locally available at the local data store. The recognition module may be configured to send a request to a remote device for mapping information when it is determined that mapping information corresponding to the one or more data points is not locally available at the image capture device. The recognition module may be configured to receive mapping information corresponding to the one or more data points in response to the request and locally store the mapping information at the local data store.

The disclosed subject matter also relates to a machine-readable medium comprising instructions stored therein, which when executed by a machine, cause the machine to perform operations comprising analyzing an image captured at an image capture device. The operations may further include identify one or more data points corresponding to a first person based on the analyzing. The operations may further include determining if mapping information corresponding to the one or more data points is locally available at the image capture device, the mapping information comprising a mapping of a set of data points to a person. The operations may further include sending a request to a remote device for mapping information when it is determined that mapping information corresponding to the one or more data points is locally available at the image capture device and providing identifier information associated with the first person at the image capture device if mapping information corresponding to the one or more data points is locally available at the image capture device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
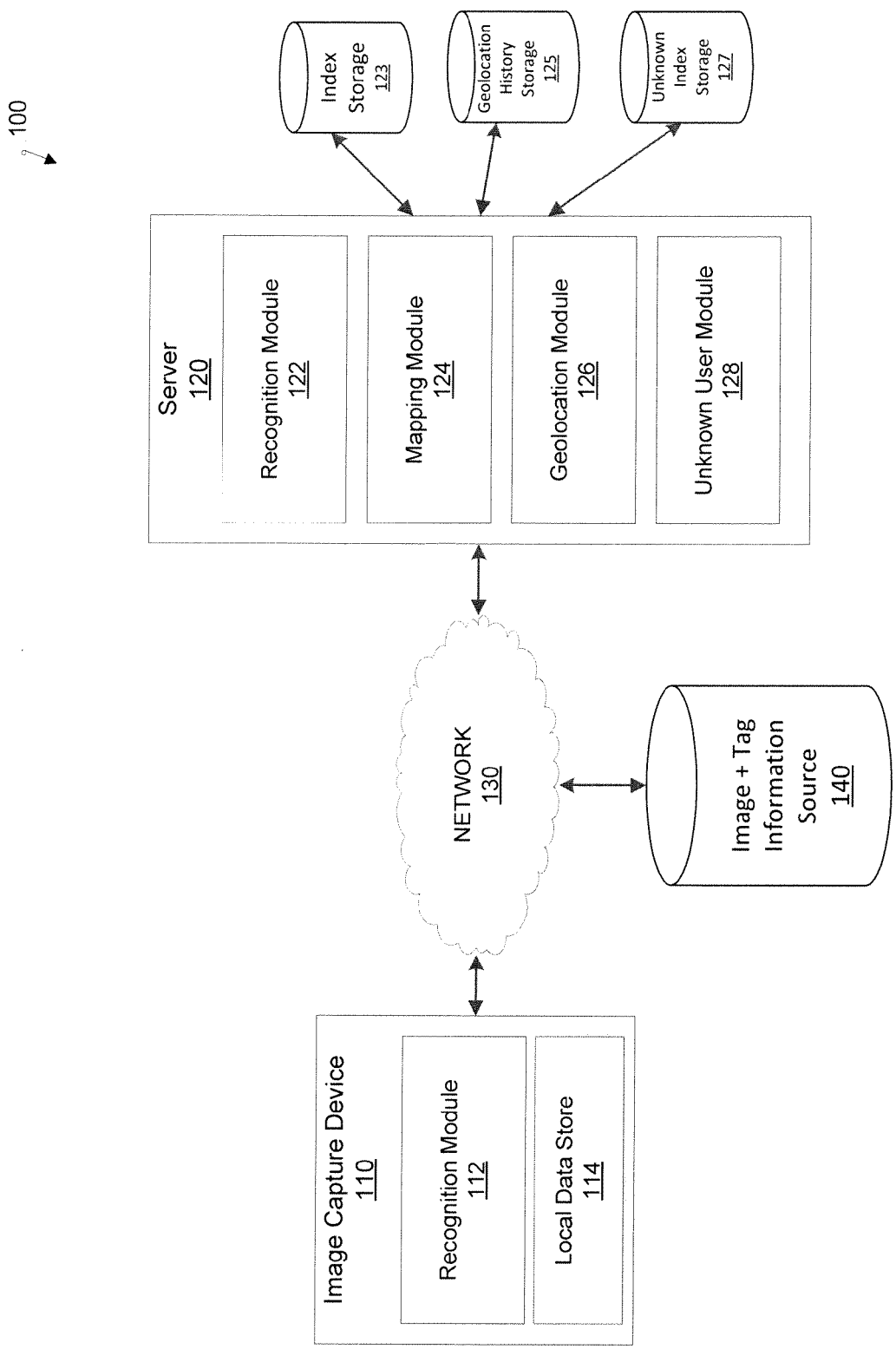
FIG. 1 illustrates an example client-server network environment, which provides for real-time facial recognition of images captured using an image capture device.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The present disclosure provides a method and system for real-time facial recognition of images captured using an image capture device. In one example, the image capture device may comprise image capturing glasses, or other similar image capture devices, configured to capture images of items in the field of view of the image capture device. In one example, the image capture device may be a wearable portable image capture device. In one example the image capture device captures images and sends the images to a server for processing to facilitate real-time and/or local facial recognition for one or more persons ("users") in the vicinity and/or field of view of the image capture device.

In one example, the image capture device may scan its surrounding and capture images of its surroundings (e.g., objects within its field of view). The images may be captured periodically (e.g., according to a capture rate), continuously, and/or once an object is detected within the field of view of the image capture device. The image capture device is in communication with a local database and/or a remote server. In some implementations, the local database and/or the remote server (e.g., at a remote database) store mapping information defining mapping of facial (or other user features) data points (indexes) to corresponding users. In some examples, the image capture device, upon capturing an image, compares the data points within the captured image to the mapping information in the local database.

In some implementations, the data points extracted from the capture image are compared to the data points stored for each user. If, in response to the comparison, a mapping corresponding to the data points (e.g., a mapping associated with data points that match the captured image data points) is identified, the user associated with the mapping is identified as the user corresponding to the captured image (or the captured data points).

Otherwise, if the local database does not include a mapping corresponding to the data points within the captured image, the data points are sent to the remote server for analysis. The remote server has access to a database of mapping information for one or more users. The mapping information for each user includes a mapping of data points (indexes) to a user (e.g., a set of data points, extracted from one or more images, mapped to the person which the data points represent).

In one example, the database is built by accessing one or more data sources having image and tag data (e.g., one or more social networking services). The image and tag data provides several images (e.g., photos, videos) and tag information indicating that an image corresponds to a specific user (e.g., identified by a user identifier). The images for each user can be scanned to build a set of data points corresponding to that user and may be stored within the database as a mapping of the data points and the user corresponding to the data points. In some instances, user information may also be obtained through other sources such as emails, calendar information, maps or other services having user information (including image and tag data, or other user identifying information).

The server, upon receiving an image from the image capture device, compares the data points within the image to the mappings stored in the database to find mapping information corresponding to the data points within the captured image. In one example the location of the image capture device may be compared with the location of a user to determine and/or confirm a mapping of the data points of the captured image and a user (e.g., if the user is close to the image capture device, it is more likely that the image captured corresponds to the user). For example, the location of an identified user, in response to comparing data points (e.g., the captured data points to data points associated with mappings), may be compared against the location of the image capture device to confirm that the correct user is identified.

If mapping information corresponding to the data points is identified (e.g., data points associated with the mapping match the data points of the captured image), the index containing the user (e.g., the index corresponding to the mapping) is sent to the image capture device, and stored at the local database. The image capture device then can access the local database to identify the user by accessing the mapping information stored in the local database (e.g., as long as the user is in the field of view of the image capture device). In one example, once the user is identified, the information regarding the user may be provided for display at the image capture device. For example, a box may be placed around the user (e.g., while the user is still in view) and/or the identifier information for the user may be provided for display. In some implementations, identifier information about the user may also be provided in other manners including for example audio announcing the identifier information, or other signals or indication that the user is within the field of view of the image capture device.

In some implementations, if the remote server determines that the data points of the captured image do not correspond to any mapping information, the remote server may index the image and store the index information along with some additional contextual information (e.g., in a second database). The contextual information may, for example, include recency of the image, length of interaction, and frequency of interaction, or other information indicative of possible importance or relevance of the captured user with respect the user associated with the image capture device (e.g., user holding or wearing the image capture device). In one example, a score is calculated based on the contextual information. The calculated score may be compared to other image data (e.g., for one or more other captured images) stored in the database and/or to a threshold score. In some examples, the index information for the captured image (e.g., user face) is stored if the score meets a pre-defined condition based on the comparison. Additional inputs of the image capture device (e.g., audio, user input, etc.) or other sources (e.g., social networking services, etc.), may be used in some examples, to identify the user corresponding to the unknown captured image.

Index information for a user may also be provided in response to geolocation information indicating that a nearby user is likely to be in the vicinity of the image capture device. The proximity of a user (e.g., a user other than the operator of the image capture device, contacts, etc.) to the image capture device increases the likelihood that the image capture device will at some point in the near future capture an image of the nearby user, and thus, requires indexes corresponding to the user to recognize the user. In one example, location information regarding various users, including for example users (e.g., contacts) associated with the user operating the image capture device, may be determined and compared to the location of the image capture device (or the user operating the device). When it is determined that a user is in vicinity of the image capture device, the server may provide mapping information (e.g., indexes) corresponding to the nearby user to the image capture device for storage at the local database. In this manner, the image capture device has the mapping information to recognize the nearby user in real-time (e.g., while the user is still in the field of view) once the user enters the field of view of the image capture device using local information stored at the local database.

In such manner, real-time facial recognition is facilitated locally at an image capture device.

FIG. 1 illustrates an example client-server network environment, which provides for real-time facial recognition of images captured using an image capture device. A network environment 100 includes an image capture device 110 and a server 120 communicably connected by a network 130. Network 130 can be a public communication network (e.g., the Internet, cellular data network, dialup modems over a telephone network) or a private communications network (e.g., private LAN, leased lines). Further, network 130 can include, but is not limited to, any one or more of the following network topologies, including a bus network, a star network, a ring network, a mesh network, a star-bus network, a tree or hierarchical network, and the like.

In some example implementations, image capture device 110 can be computing devices such as glasses, laptop or desktop computers, smartphones, PDAs, portable media players, tablet computers, or other appropriate computing devices having image capturing capability. In some examples, image capture device 110 includes a recognition module 112 and a local data store 114. Recognition module 112 may be configured to facilitate real-time facial recognition of images captured using the image capture device 110. Local data store 114 (e.g., a cache) may store local copies of mapping information for facilitating real-time facial recognition of images captured using the image capture device 110.

Server 120 may be a processor-based computing device such as a computer server, or other computing device, including a recognition module 122, mapping module 124, geolocation module 126 and unknown user module 128. In some examples server 120 (including one or more of the modules 122, 124, 126 and 128) may have access to an index storage 123, a geolocation history storage 125 and an unknown index storage 127.

In one example, recognition module 122 is in communication with the image capture device 110 (e.g., through network 130) and is configured to receive captured image information from the image capture device. The recognition module 122 is configured to determine a mapping of a user to the captured image and provide mapping information to the image capture device for facilitating real-time facial recognition of images captured using the image capture device. The mapping service 124 may be configured to receive data points corresponding to a captured image, or portion thereof (e.g., a portion representing a face), and determine a mapping of the data points within the captured image, or portion thereof, to a user. In one example, the index storage 123 includes mapping information. In some example, the mapping information defines a mapping from a set of data points to a user for a plurality of users. In one example, the information stored at the index storage 123 is generated from image and tag data stored at an image and tag information source 140.

The image and tag information source 140 may include one or more services or data stores (e.g., social networking services) storing image and tag data corresponding to one or more users. In one example, server 120 (e.g., at the mapping module 124) is configured to receive image and tag data from the image and tag information source 140 and generate mapping information (e.g., indexes) for storage in the index storage 123.

The geolocation module 126 may be configured to determine geographic matches between a geographic location of a user associated with (e.g., operating) the image capture device 110 and one or more other users in the vicinity. In one example, location information may be provided by the image capture device 110 and compared to data regarding location of one or more other users. Such information may be accessed from one or more remote services and/or may be stored at the geolocation history storage 125. In some examples, geolocation history storage 125 may also store location information (e.g., geographic data generated by a location service, based on matches between an image and a user, or otherwise available to the server) for future use. In one example, geolocation module 126 may be configured to compare mappings generated by the mapping module 124 to confirm the mapping using geolocation data. In another example, geolocation module 126 may be configured to determine likely users to be in the vicinity of the image capture device 110, such that mapping information for the users can be sent to the image capture device 110.

The unknown user module 128 is configured to determine and/or store information regarding images (e.g., users) captured by the image capture device 100 for which mapping information is not readily available (e.g., within the index storage). In some examples, the unknown user module 128 may be configured to store user information for one or more unknown users within the unknown index storage 127. In some examples, the unknown user module 128 may be configured to determine a mapping of unknown user data points to a user according to various criteria.

In some example aspects, server 120 can be a single computing device such as a computer server. In other implementations, server 120 can represent more than one computing device working together to perform the actions of a server computer (e.g., cloud computing). Server 120 may be coupled with various remote databases or storage services. While server 120 is displayed as being remote from one another, it should be understood that the functions performed by these servers may be performed within a single server, or across multiple servers.

Communications between the image capture device 110, server 120 and/or image and tag information source 130 may be facilitated through various communication protocols. In some aspects, one or more of the image capture device 110, server 120 and/or image and tag information source 140, and/or one or more remote services may communicate wirelessly through a communication interface (not shown), which may include digital signal processing circuitry where necessary. The communication interface may provide for communications under various modes or protocols, including Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including using a Bluetooth, WiFi, or other such transceiver.

The network 130 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

In some implementations, the image capture device 110 is configured to capture images of its surroundings (e.g., objects within its field of view). The images may be captured periodically (e.g., according to a capture rate), continuously, and/or once an object is detected within the field of view of the image capture device. When an image is captured at the image capture device 110, the recognition module 112 may receive the captured image and may be facilitated to generate data points corresponding to an image of a user (e.g., data points corresponding to a human face within the captured image). The recognition module 112 may be further configured to compare the generated data points to mapping information stored in the local data store 114 to determine if the data points correspond to a mapping stored in the data store 114, for example, by comparing the data points to the data points for each mapping. If so, the mapping is retrieved and the user within the image is identified.

Otherwise, if mapping information regarding the data points within the captured image are not available within the data store 114, the data points are sent to the server 120 for analysis. The recognition module 122 provides a request to the mapping module 124 for a mapping corresponding to the data points within the captured image. The mapping module 124 may access the index storage 123 to determine if a mapping having indexes matching the data points is available at the index storage 123.

In addition, in some implementations, the location of the image capture device may be determined. The recognition service 122 may send a request to the geolocation service 126 for comparison of the determined location of the image capture device, or the user operating the device, with the location of a user to determine and/or confirm that he data points of the captured image match data points mapped to a user (e.g., if the user is close to the image capture device, it is more likely that the image captured corresponds to the user).

In some implementations, if a mapping is identified by the mapping module 124 and/or geolocation module 126, the mapping is provided to the recognition module 122. In some examples, the recognition module 122 sends mapping information (e.g., the index containing the user corresponding to the image) to the image capture device 110. In one example, the mapping information is received at the image capture device and stored at the local data store 114. The recognition module 112 can, in some examples, access the local data store 114 to identify the user using the mapping information (e.g., as long as the user is in the field of view of the image capture device 10).

In some implementations, in addition to providing the mapping information the image capture device 110 in response to a request from the image capture device 110 (e.g., in response to a user image being captured by the image capture device), server 120 may provide mapping information for storage within local data store 114 in response to geolocation information indicating that a user is likely to be in the vicinity of the image capture device. That is, geographic location of the image capture device may be compared to the location of other users, for example at the geolocation module 126, to determine if one or more other users are in the vicinity of the image capture device 110, which increases the likelihood that the image capture device 110 will at some point in the near future capture an image of the nearby user and thus require mapping information corresponding to the user to recognize the user.

In some examples, the location information for the users and/or image capture device may be retrieved from geolocation history storage 125 and may include various information such as calendar data, or other similar data indicating a location of users. In another example, information regarding the location of the image capture device 110 and/or one or more users (or devices operated by the users) may be retrieved from one or more third party services (e.g., GPS services, user mobile device locating services, etc.). When it is determined that a user is in the vicinity of the image capture device 110, the geolocation module 126 may provide mapping information corresponding to the nearby user (e.g., via recognition module 122) to the image capture device 110 for storage at the local data store 114.

In one example, the recognition module 112 is configured to provide information regarding the user at the image capture device 110 once the user is identified For example, a box may be placed around the user (e.g., while the user is still in view) and the identifier information for the user may be provided for display. In other example, the identifier information may be provided to the user operating the image capture device in various other ways (e.g., audio or other signals).

In some implementations, if the data points sent by the image capture device 110 to the server 120 do not correspond to any mapped indexes based on the findings of mapping module 124 and/or geolocation module 126, the data points of the captured image may be provided to the unknown user module 126. The unknown user module 126 may index the image and/or data points and store the index information along with some additional contextual information at the unknown index storage 127. In one example, the unknown user module 126 may calculate a score based on the contextual information. The calculated score may be compared to scores for other images stored in the unknown index storage database 127 and/or to a threshold score. In some examples, the indexed data from the captured image (e.g., user face) is stored in the unknown index storage 128 if the score meets a pre-defined condition based on the comparison. Additional input of the image capture device 110 (e.g., audio) or other sources, may be used in some examples, to identify the user corresponding to the unknown user in the captured image.

Figure 2:
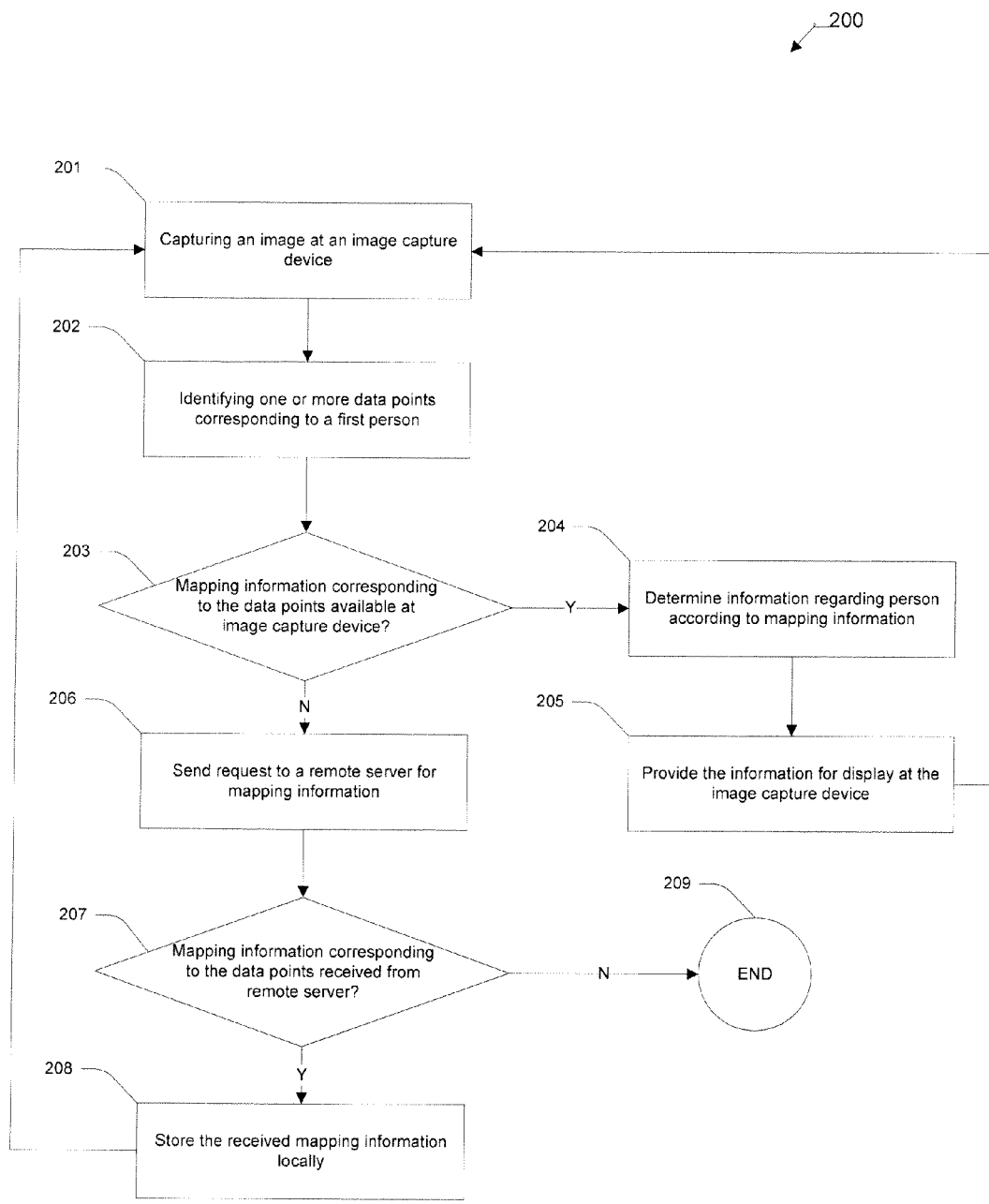
FIG. 2 illustrates a flow diagram of an example process 200 for real-time facial recognition of images captured using an image capture device.

FIG. 2 illustrates a flow diagram of an example process 200 for real-time facial recognition of images captured using an image capture device. In step 201, an image is captured at an image capture device. In one example, the image capture device may scan its surrounding and capture images of its surroundings (e.g., objects within its field of view). The images may be captured periodically (e.g., according to a capture rate), continuously, and/or once an object is detected within the field of view of the image capture device. In step 202, the captured image is analyzed to identify one or more data points corresponding to a first person within the image. In one example, various techniques may be used for recognizing faces of one or more persons within an image. Each recognized face may then be analyzed to determine one or more data points representing features of the face, such that facial recognition may be performed with respect to the recognized face image.

In step 203, it is determined if mapping information corresponding to the data points is available locally. In one example, a local storage (e.g., cache) may store mapping information regarding mappings of data points (indexes) to corresponding users. In some examples, the image capture device, upon capturing an image, compares the data points within the captured image to the data points of the mappings in the local database. The local database may include mapping information provided in response to prior requests send to a remote server storing mapping information as described in more detail below with respect to process 200.

Mapping information for a user may also be provided for local storage, and thus available within the local database, in response to geolocation information indicating that a user is likely to be in the vicinity of the image capture device, which increases the likelihood that the image capture device will at some point in the near future capture an image of the user and thus require indexes corresponding to the user to recognize the user.

If, in step 203, it is determined that there is mapping information stored locally corresponding to the data points, the process continues to step 204. In step 204, information regarding the person captured in the image is retrieved according to the mapping information. In one example, the information may include an identifier of the person (e.g., name, id, etc.). In some implementations, the information may include other demographic information regarding the user. The information may further include a profile, account, page or other data corresponding to the user.

In step 205, the information is provided to the user at the image capture device. In one example, once the user corresponding to the captured face is identified, the information regarding the user may be provided for display at the image capture device. For example, a box may be placed around the portion of the image including the face of the user (e.g., while the user is still in view) and the identifier information for the user may be provided for display. In another example, an audio notification may be provided at the image capture device indicating that the identified user is within the field of view of the image capture device.

Otherwise, if in step 203, it is determined that the local database does not contain mapping information corresponding to the data points within the captured image, in step 206, a request is sent to a remote server for mapping information corresponding to the data points. In one example, the request includes the data points identified in step 202. In another example, the captured image may be sent to the remote server and the remote server may analyze the image to identify the one or more data points. The remote server has access to a database of mapping information corresponding to a set of users. In some examples, the mapping information for each user may include a set of data points mapped to the user which the data points represent.

In one example, the database is built by accessing one or more data sources having image and tag data (e.g., one or more social networking services). The image and tag data provides images (e.g., photos, videos) and tag information indicating that each image (or portion thereof) corresponds to a specific user (e.g., identified by a user identifier). The images for each user can be scanned to build a set of data points corresponding to each user and may be stored within the database.

The server, upon receiving an image and/or data points corresponding to a person from the image capture device, compares the data points within the image to the data points stored in the database to find a mapping corresponding to the data points within the captured image. In addition to comparing data points, in one example the location of the image capture device may be compared with location of a user to determine and/or confirm a mapping of the data points to a user (e.g., if the user is close to the image capture device, it is more likely that the image captured corresponds to the user).

If mapping information corresponding to the captured data points is identified, in some examples, the identified mapping information (e.g., the index containing the user represented by the image) is sent to the image capture device. In some implementations, if the server determines that the data points sent by the server do not correspond to any mapping information in the server database, the server may index the image and store the index information along with some additional contextual information.

In step 207, it is determined if mapping information corresponding to the image and/or the data points within the image is received in response to the request. If so, in step 208, the mapping information is stored at the local database. The image capture device then can access the local database to identify the user corresponding to the data points (e.g., as long as the user is in the field of view of the image capture device). Otherwise, if no mapping information is received, the process ends in step 209. In some examples, a warning or other indication that the user cannot be recognized can be provided for display.

In such manner, real-time facial recognition is facilitated locally at an image capture device.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 3:
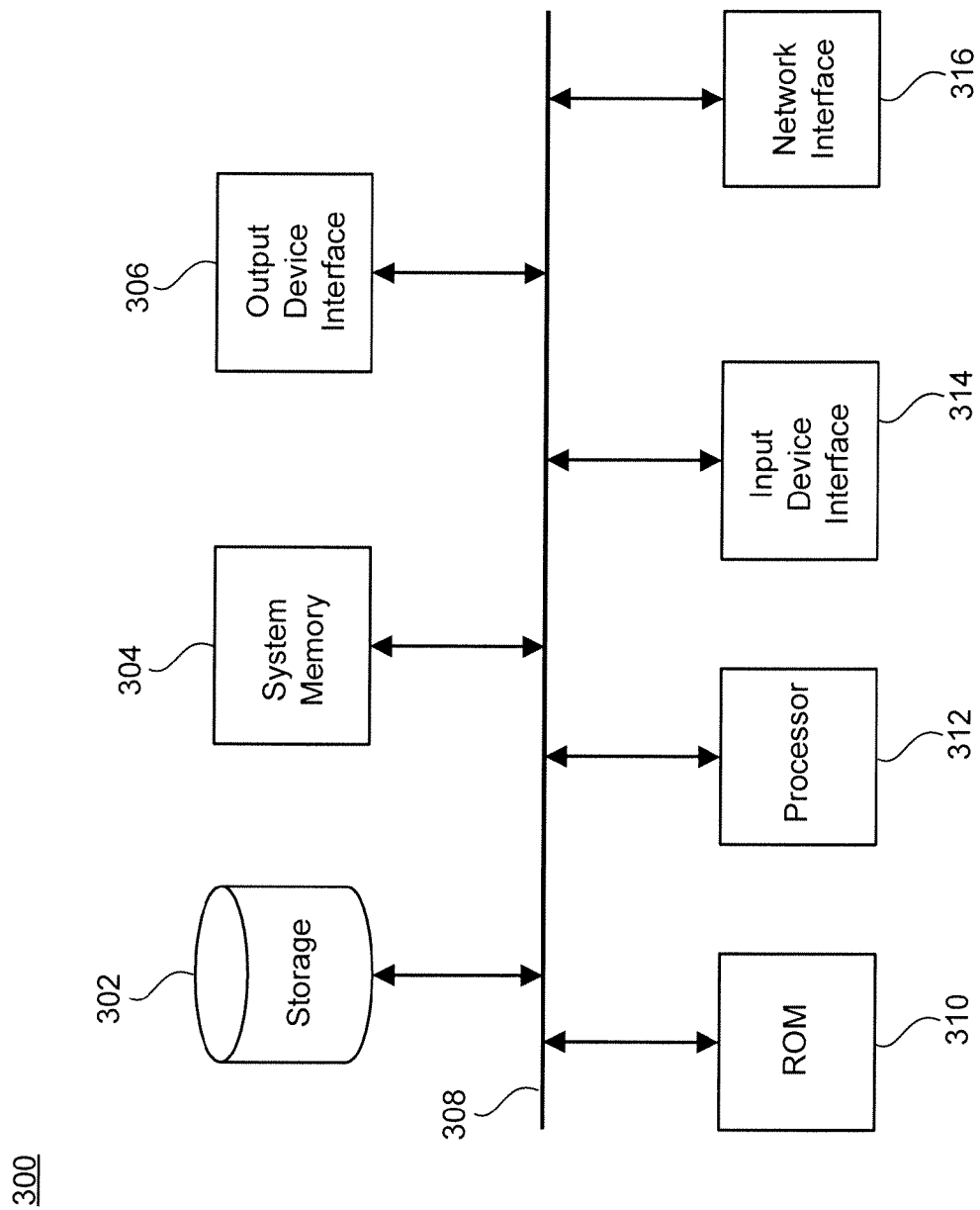
FIG. 3 conceptually illustrates an electronic system with which some implementations of the subject technology are implemented.

FIG. 3 conceptually illustrates an electronic system with which some implementations of the subject technology are implemented. Electronic system 300 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 300 includes a bus 308, processing unit(s) 312, a system memory 304, a read-only memory (ROM) 310, a permanent storage device 302, an input device interface 314, an output device interface 306, and a network interface 316.

Bus 308 collectively represents all system, peripheral, and chipset buses that communicatively connect the numerous internal devices of electronic system 300. For instance, bus 308 communicatively connects processing unit(s) 312 with ROM 310, system memory 304, and permanent storage device 302.

From these various memory units, processing unit(s) 312 retrieves instructions to execute and data to process in order to execute the processes of the subject disclosure. The processing unit(s) can be a single processor or a multi-core processor in different implementations.

ROM 310 stores static data and instructions that are needed by processing unit(s) 312 and other modules of the electronic system. Permanent storage device 302, on the other hand, is a read-and-write memory device. This device is a non-volatile memory unit that stores instructions and data even when electronic system 300 is off. Some implementations of the subject disclosure use a mass-storage device (such as a magnetic or optical disk and its corresponding disk drive) as permanent storage device 302.

Other implementations use a removable storage device (such as a floppy disk, flash drive, and its corresponding disk drive) as permanent storage device 302. Like permanent storage device 302, system memory 304 is a read-and-write memory device. However, unlike storage device 302, system memory 304 is a volatile read-and-write memory, such a random access memory. System memory 304 stores some of the instructions and data that the processor needs at runtime. In some implementations, the processes of the subject disclosure are stored in system memory 304, permanent storage device 302, and/or ROM 310. For example, the various memory units include instructions for facilitating real-time facial recognition according to various embodiments. From these various memory units, processing unit(s) 312 retrieves instructions to execute and data to process in order to execute the processes of some implementations.

Bus 308 also connects to input and output device interfaces 314 and 306. Input device interface 314 enables the user to communicate information and select commands to the electronic system. Input devices used with input device interface 314 include, for example, alphanumeric keyboards and pointing devices (also called "cursor control devices"). Output device interfaces 306 enables, for example, the display of images generated by the electronic system 300. Output devices used with output device interface 306 include, for example, printers and display devices, such as cathode ray tubes (CRT) or liquid crystal displays (LCD). Some implementations include devices such as a touchscreen that functions as both input and output devices.

Finally, as shown in FIG. 3, bus 308 also couples electronic system 300 to a network (not shown) through a network interface 316. In this manner, the computer can be a part of a network of computers (such as a local area network ("LAN"), a wide area network ("WAN"), or an Intranet, or a network of networks, such as the Internet. Any or all components of electronic system 300 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
   capturing an image at an image capture device, the image containing at least a first person;
   analyzing the image to identify one or more data points corresponding to the first person;
   determining if mapping information corresponding to the one or more data points is locally available at the image capture device;
   when it is determined that the mapping information corresponding to the one or more data points is not locally available at the image capture device:
      sending a request to a remote device for mapping information,
      receiving mapping information corresponding to the one or more data points in response to the request, wherein the mapping information is determined based at least in part on a determined location of the image capture device, and
      locally storing the mapping information at the image capture device; and
   when it is determined that the mapping information corresponding to the one or more data points is locally available at the image capture device, accessing the mapping information that is locally available.

2. The method of claim 1, wherein the mapping information comprises data points corresponding to images of a first person mapped to identifier information corresponding to the first person.

3. The method of claim 1, further comprising:
   capturing a second image at the image capture device, the second image containing the first person; and
   identifying the first person within the second image in real-time using the received mapping information matching the one or more data points.

4. The method of claim 1, further comprising:
   determining that the mapping information corresponding to the one or more data points is locally available at the image capture device; and
   identifying the first person within the image in real-time using the mapping information that is locally available at the image capture device.

5. The method of claim 4, further comprising:
   providing identifier information regarding the first person at the image capture device.

6. The method of claim 1, further comprising:
   receiving the request at the remote device;
   determining if mapping information corresponding to the one or more data points is available at one or more data stores accessible by the remote device; and
   providing the mapping information in response to the request if the mapping information is available at one or more data stores accessible by the remote device.

7. The method of claim 6, wherein the determining if mapping information corresponding to the one or more data points is available at one or more data stores accessible by the remote device comprises:
   providing a request to compare the data points to one or more mappings stored at the one or more data stores, each mapping including a set of data points corresponding to a person; and determining if the data points correspond to a mapping of the one or more mappings.

8. The method of claim 7, wherein each of the one or more mappings defined an association between a person and a set of data points defining facial features of the person.

9. The method of claim 8, wherein each mapping of the one or more mappings is generated by analyzing a set of image and tag information stored at one or more services having image and tag data.

10. The method of claim 7, further comprising:
confirming that the mapping of the one or more mappings corresponds to the data points by determining a location of the person corresponding to the mapping; and
comparing the determined location of the person to the determined location of the image capture device.

11. The method of claim 7, further comprising:
providing mapping information corresponding to mapping in response to the request if the data points correspond to the mapping of the one or more mappings.

12. The method of claim 7, further comprising:
providing the data points for storage as corresponding to an unknown user if the data points do not correspond to the mapping of the one or more mappings.

13. The method of claim 12, further comprising:
identifying a plurality of stored data point sets corresponding to one or more other unknown users, each having a score;
determining a threshold unknown user score;
generating a score for the data points provided for storage; and
storing the data points provided for storage if the score satisfies a condition with respect to one or both of the score for each stored data point set or the threshold unknown user score.

14. The method of claim 1, wherein the mapping information that is locally available was received by the image capture device in response to a previous request to the remote device.

15. The method of claim 1, further comprising:
determining the determined location of the image capture device;
identifying one or more persons having a location within a threshold distance of the determined location of the image capture device;
retrieving mapping information corresponding to each of the one or more persons; and
providing, by the remote device, the retrieved mapping information to the image capture device for local storage.

16. The method of claim 1, wherein the image capture device is a wearable portable image capture device.

17. The method of claim 16, wherein the captured image includes a field of view of a user wearing the image capture device.

18. The method of claim 1, wherein the mapping information corresponds to one or more persons determined to have a location within a threshold distance of the location of the image capture device.

19. A device comprising:
one or more processors; and
a memory comprising instructions that, when executed by the one or more processors, cause the one or more processors to:
analyze an image captured by an image capture device to identify one or more data points corresponding to a first person within the image;
determine if mapping information corresponding to the one or more data points is locally available at a local data store;
send a request to a remote device for mapping information when it is determined that mapping information corresponding to the one or more data points is not locally available at the image capture device;
receive mapping information corresponding to the one or more data points in response to the request;
confirm that the mapping information corresponds to the one or more data points based at least in part on a determined location of a person corresponding to the mapping information and a location of the image capture device; and
locally store the mapping information at the local data store.

20. A machine-readable medium comprising instructions stored therein, which when executed by a machine, cause the machine to perform operations comprising:
analyzing an image captured at an image capture device;
identifying one or more data points corresponding to a first person based on the analyzing;
determining if mapping information corresponding to the one or more data points is locally available at the image capture device, the mapping information comprising a mapping of a set of data points to a person;
sending a request to a remote device for mapping information when it is determined that mapping information corresponding to the one or more data points is not locally available at the image capture device, wherein the one or more data points are stored at the remote device as corresponding to an unknown user when a score for the one or more data points satisfies a condition with respect to another score of another stored data point set corresponding to another unknown user; and
providing identifier information associated with the first person at the image capture device if mapping information corresponding to the one or more data points is locally available at the image capture device.

* * * * *